(12) United States Patent
Griffin et al.

(10) Patent No.: US 7,463,161 B2
(45) Date of Patent: Dec. 9, 2008

(54) CHILD RESTRAINT SYSTEM WITH CHILD SEAT MONITORING SYSTEM AND METHOD FOR MONITORING A CHILD SEAT

(75) Inventors: Dennis P. Griffin, Noblesville, IN (US); William W. Fultz, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 319 days.

(21) Appl. No.: 11/292,553

(22) Filed: Dec. 2, 2005

(65) Prior Publication Data

US 2007/0126566 A1    Jun. 7, 2007

(51) Int. Cl.
*G08B 21/00*    (2006.01)

(52) U.S. Cl. .................. 340/667; 340/665; 340/666; 340/425.5; 340/573.1; 340/870.17; 180/271; 280/735; 297/250.1; 701/45

(58) Field of Classification Search .............. 340/438, 340/425.5, 449, 457, 457.1, 573.1, 667, 870.17, 340/665, 666; 180/271, 272; 280/734, 735; 701/44, 45; 297/250.1, 136
See application file for complete search history.

(56) References Cited

U.S. PATENT DOCUMENTS

| | | | |
|---|---|---|---|
| 5,941,560 A | 8/1999 | Wolfram | 280/735 |
| 5,949,340 A * | 9/1999 | Rossi | 340/573.1 |
| 6,089,662 A | 7/2000 | Lambert | 297/238 |
| 6,095,604 A | 8/2000 | Stack | 297/254 |
| 6,266,592 B1 | 7/2001 | LeMense | 701/45 |
| 6,696,943 B1 | 2/2004 | Elrod et al. | |
| 6,703,845 B2 * | 3/2004 | Stanley et al. | 324/663 |
| 6,779,843 B2 | 8/2004 | Kain | 297/250.1 |
| 6,809,643 B1 * | 10/2004 | Elrod et al. | 340/539.1 |
| 6,863,350 B1 | 3/2005 | McCulley | 297/465 |
| 6,922,147 B1 * | 7/2005 | Viksnins et al. | 340/573.1 |
| 2002/0161501 A1 | 10/2002 | Dulin et al. | |
| 2004/0113797 A1 | 6/2004 | Osborne | |
| 2005/0121956 A1 | 6/2005 | Dolan | 297/253 |
| 2005/0275554 A1 * | 12/2005 | Patterson et al. | |

FOREIGN PATENT DOCUMENTS

WO    WO 02/085685    10/2002

* cited by examiner

*Primary Examiner*—Hung T. Nguyen
(74) *Attorney, Agent, or Firm*—Douglas D. Fekete

(57) ABSTRACT

A child restraint system with a child seat monitoring system and a method for monitoring a child seat are provided. The child restraint system is adapted to be mounted within a vehicle. The child restraint system includes a child seat having a carrier portion and a handle coupled to the carrier portion. The child restraint system further includes a temperature sensor disposed on the handle for generating a first signal indicative of a temperature in a predetermined region of the child seat.

22 Claims, 7 Drawing Sheets

1: FIRST THRESHOLD TEMPERATURE
2: SECOND THRESHOLD TEMPERATURE
3: THIRD THRESHOLD TEMPERATURE
4: FOURTH THRESHOLD TEMPERATURE

CHILD RESTRAINT SYSTEM WITH CHILD SEAT MONITORING SYSTEM AND METHOD FOR MONITORING A CHILD SEAT

TECHNICAL FIELD

This application relates to a child restraint system with a child seat monitoring system and a method for monitoring a child seat.

BACKGROUND

Child restraint systems have been utilized to hold infants or children within vehicles. One type of child restraint system includes a child seat and a base portion for holding the seat, that are rearward-facing with respect to a vehicle seat. A second type of child seat restraint system utilizes a rearward-facing child seat without the base portion. A third-type of child restraint system is a booster child seat that is frontward-facing with respect to the child seat. When a temperature proximate a child seat is a relatively high temperature, a child secured in the child seat can become overheated.

Accordingly, the inventors herein have recognized a need for a child seat monitoring system that can determine when a temperature proximate a child seat is greater than or equal to a threshold temperature.

SUMMARY OF THE INVENTION

A method for monitoring a child seat in accordance with an exemplary embodiment is provided. The method includes generating a first signal indicative of a temperature in a predetermined region of the child seat via a temperature sensor disposed on the child seat. The method includes determining when the temperature is greater than or equal to a first threshold temperature value or less than or equal to a second threshold temperature value. The second threshold temperature value is less than the first threshold temperature value. The method further includes generating a second signal when either the temperature is greater than or equal to the first threshold temperature value or less than or equal to the second threshold temperature value.

A child seat monitoring system for a child seat in accordance with another exemplary embodiment is provided. The child seat monitoring system includes a temperature sensor disposed on the child seat for generating a first signal indicative of a temperature in a predetermined region of the child seat. The child seat monitoring system further includes a computer operably communicating with the temperature sensor. The computer is configured to determine when either the temperature is greater than or equal to a first threshold temperature value or less than or equal to a second threshold temperature value. The second threshold temperature value is less than the first threshold temperature value. The computer is further configured to generate a second signal when either the temperature is greater than or equal to the first threshold temperature value or less than or equal to the second threshold temperature value.

A child restraint system adapted to be mounted within a vehicle in accordance with another exemplary embodiment is provided. The child restraint system includes a child seat having a carrier portion and a handle coupled to the carrier portion. The child restraint system further includes a temperature sensor disposed on the handle for generating a first signal indicative of a temperature in a predetermined region of the child seat.

DESCRIPTION OF EXEMPLARY EMBODIMENTS

Figure 1:
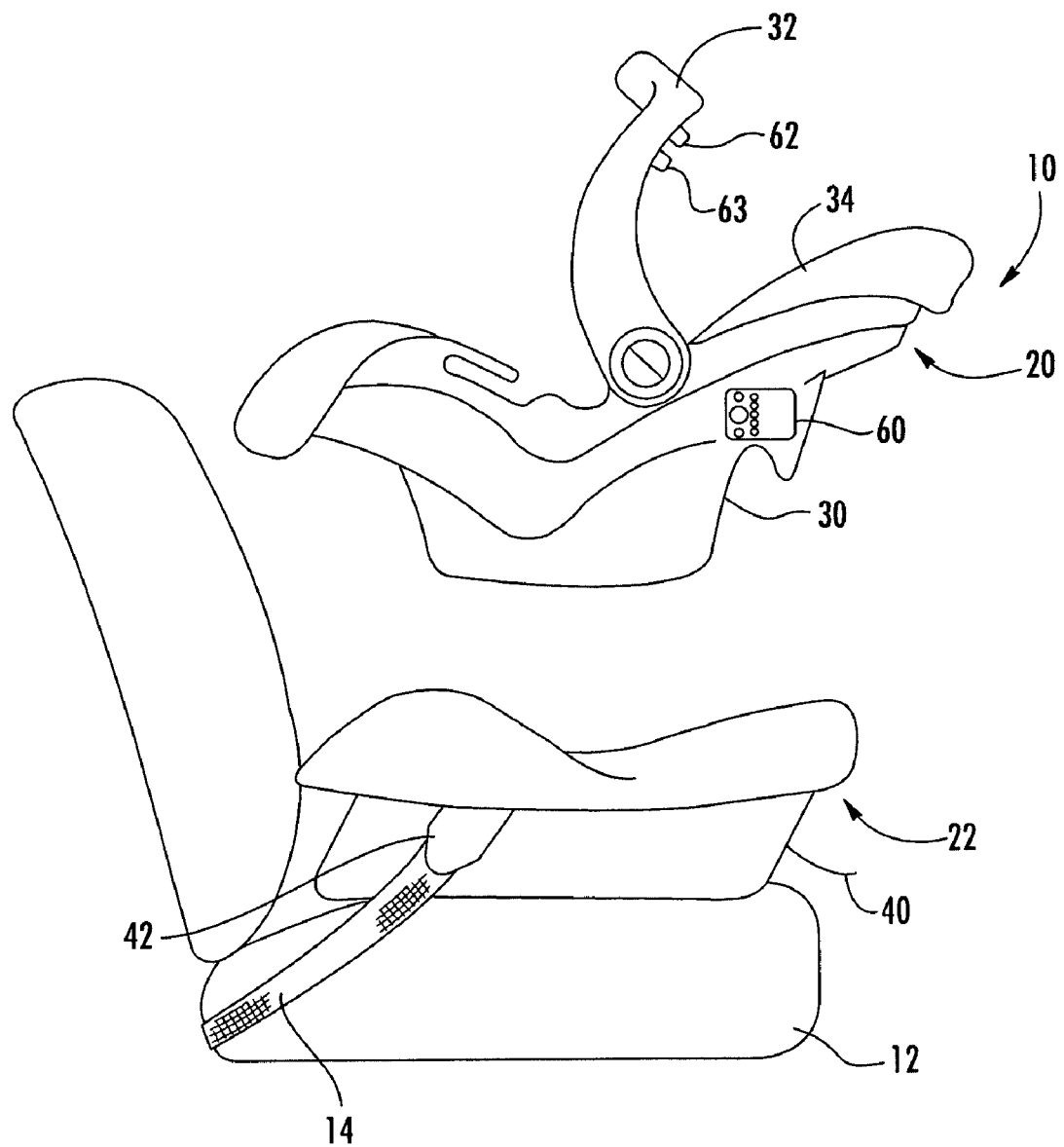
FIG. 1 is a schematic of a child restraint system having a child seat and a child seat monitoring system in accordance with an exemplary embodiment.

Referring to FIG. 1, a child restraint system 10 that can be secured to a vehicle seat 12 in accordance with an exemplary embodiment is provided. In particular, the child restraint system 10 is secured to the vehicle seat 12 by utilizing a seat belt webbing 14. The child restraint system 10 includes a child seat 20, a base portion 22, and a child seat monitoring system 24.

The child seat 20 comprises a rearward facing child seat that is configured to accommodate a child therein for transporting the child both inside and outside of a vehicle. The child seat 20 is configured to be fixedly secured to the base portion 22 and the base portion 22 is further secured via the seat belt webbing 14 to the seat 12 or to a frame of a vehicle. The child seat 20 includes a shell 30, a handle 32, and a cushion 34.

The shell 30 defines a component for accommodating the child therein. The shell 30 is typically constructed from a rigid polymeric material.

The handle 32 is coupled to the shell 30 and is provided to allow a user to easily lift the child seat 20. The handle 32 is constructed from a rigid polymeric material. Further, the seat cushion 34 is configured to be disposed over a portion of the shell 30.

The base portion 22 is provided to receive the child seat 20 therein. The base portion 22 has a shell 40 constructed from a rigid polymeric material. Further, the shell 40 includes an aperture 42 extending therethrough for receiving the seat belt webbing therethrough.

Figure 2:
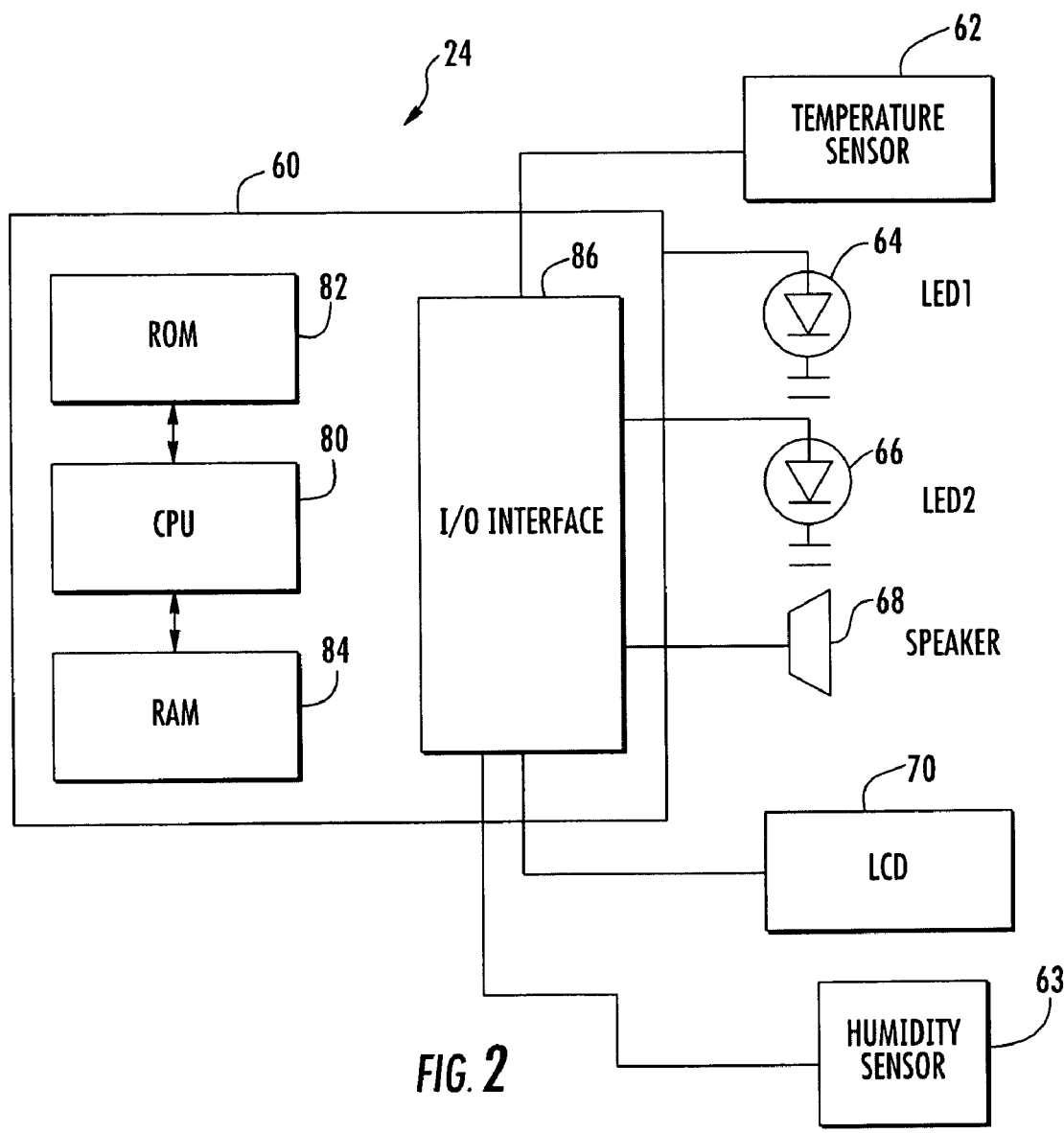
FIG. 2 is a schematic of the child seat monitoring system of FIG. 1 in accordance with an exemplary embodiment.

Referring to FIG. 2, the child seat monitoring system 24 is provided to monitor a temperature level, a temperature variation level, and a relative humidity level in a predetermined region of the child seat 20 and to alert vehicle occupants when high environmental stress conditions are detected. The child seat monitoring system 24 includes a computer 60, a temperature sensor 62, light emitting diodes (LEDs) 64, 66, an electrical speaker 68, a liquid crystal display (LCD) 70, and a humidity sensor 63.

The computer 60 is provided to monitor a temperature level, a temperature variation level, and a relative humidity level in a predetermined region of the child seat 20 as will be explained in greater detail below. The computer 60 is further provided to control operation of indicator devices including the LEDs 64, 66, the electrical speaker 68, or the LCD 70. The computer 60 includes a central processing unit (CPU) 80, a read-only memory (ROM) 82, a volatile memory such as a random access memory (RAM) 84 and an input/output (I/O) interface 86. The CPU 80 operably communicates with the ROM 82, the RAM 84, and the I/O interface 86. The computer readable media including ROM 82 and RAM 84 may be implemented using any of a number of known memory devices such as PROMs, EPROMs, EEPROMS, flash memory or any other electric, magnetic, optical or combination memory device capable of storing data, some of which represent executable instructions used by the CPU 80.

The temperature sensor 62 is provided to measure a temperature in a predetermined region of the child seat 20. The temperature sensor in the exemplary embodiment is a Passive Infra Red (PIR) thermopile sensor. In one embodiment, the temperature sensor 62 is disposed on the handle 32 and has a field of view of at least a portion of the cushion 34 when a child is not disposed in the child seat 20 and a field of view of a child's head, shoulders, and arms when the child is disposed in the child seat 20.

Figure 7:
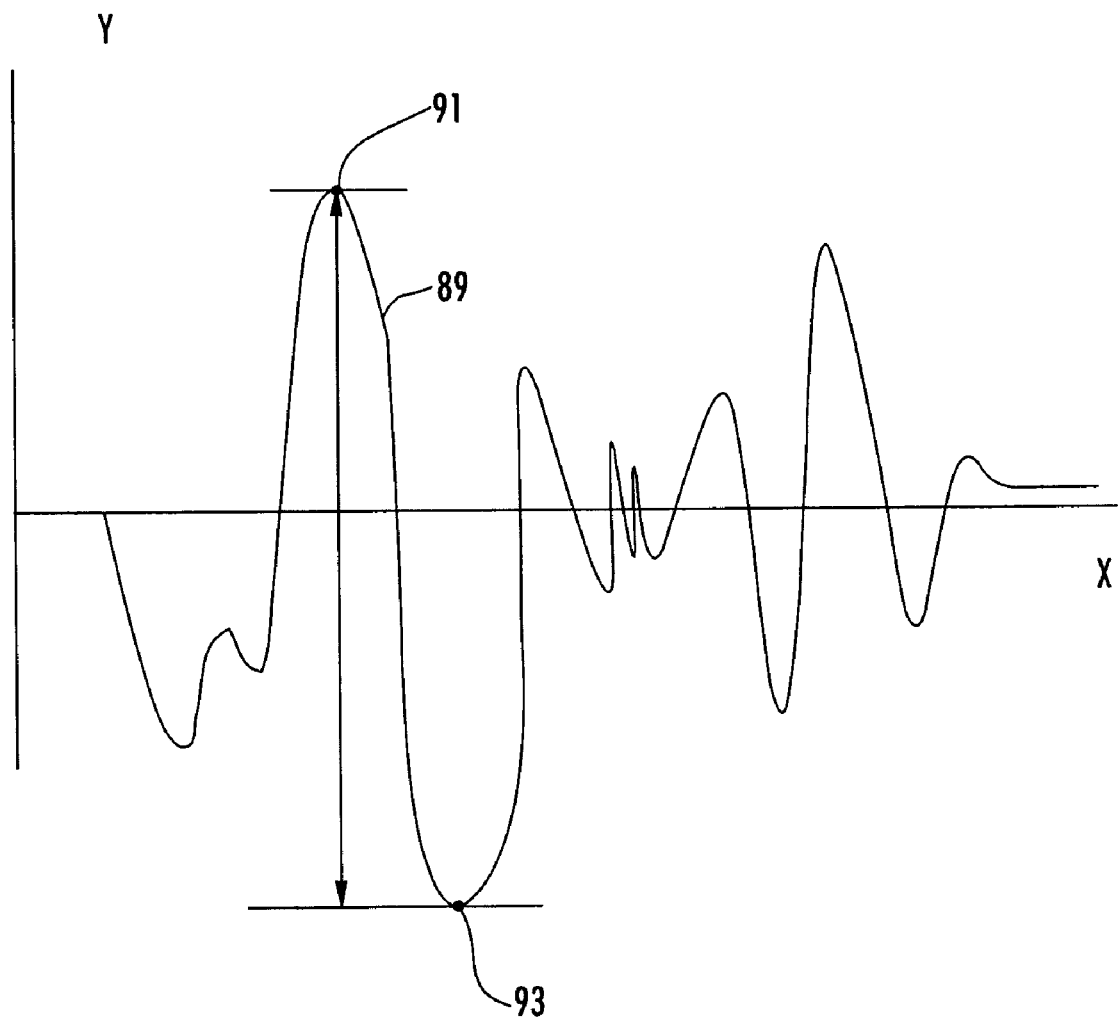
FIG. 7 is a schematic of a signal generated by a temperature sensor utilized in the child seat monitoring system of FIG. 2.

Referring to FIG. 7, a signal 89 generated by the temperature sensor 62 is shown. The amplitude of the signal 89 is directly indicative of a temperature level in a predetermined region of the child seat 20. Further, the distance between points 91, 93 indicate a measured temperature variation value over a predetermined time interval. The measured temperature variation value is directly indicative of an amount of movement by a child in the child seat 20. It should be noted that when the child is in a high environmental stress condition, (e.g., high temperature condition), an amount of movement by the child will be relatively high, and the measured temperature variation value will be greater than or equal to a predetermined temperature variation value. Alternatively, when the child is in a low environmental stress condition, the amount of movement by the child will be relatively low and the measured temperature variation value will be less than the predetermined temperature variation value.

It should be noted that in other alternate embodiments, the temperature sensor 62 could be replaced with any known sensor that is capable of determining a temperature in a predetermined region of the child seat 20.

The LED 64 is provided to emit light having a first color to indicate when a temperature in a predetermined region of the child seat 20 is greater than or equal to a first threshold temperature (e.g., 120° F.) or less than or equal to a second threshold temperature value (e.g., 0° F.). When the computer 60 induces the I/O interface 86 to output a signal to the LED 64, the LED 64 emits light having the first color.

The LED 66 is provided to emit light having a second color to indicate when a temperature in a predetermined region of the child seat 20 is less than the first threshold temperature value and greater than the second threshold temperature value. When the computer 60 induces the I/O interface 86 to output a signal to the LED 66, the LED 66 emits light having the second color.

The electrical speaker 68 is provided to emit a first audible sound when a temperature in a predetermined region of the child seat 20 is greater than or equal to a first threshold temperature (e.g., 120° F.) or less than or equal to a second threshold temperature value (e.g., 0° F.). When the computer 60 induces the I/O interface 86 to output a first signal to the speaker 68, the speaker 68 emits a first audible sound.

The electrical speaker 68 is further provided to emit a second audible sound when a temperature in a predetermined region of the child seat 20 is less than the first threshold temperature value and greater than the second threshold temperature value. When the computer 60 induces the I/O interface 86 to output a second signal to the speaker 68, the speaker 68 emits a second audible sound.

The LCD 70 is provided to display a first message when a temperature in a predetermined region of the child seat 20 is greater than or equal to a first threshold temperature (e.g., 120° F.) or less than or equal to a second threshold temperature value (e.g., 0° F.). When the computer 60 induces the I/O interface 86 to output a first signal to the LCD 70, the LCD 70 emits a first display message. The LCD 70 is further provided to display a second message when a temperature in a predetermined region of the child seat 20 is less than the first threshold temperature value and greater than the second threshold temperature value. When the computer 60 induces the I/O interface 86 to output a second signal to the LCD 70, the LCD 70 emits a second display message.

Figure 3:
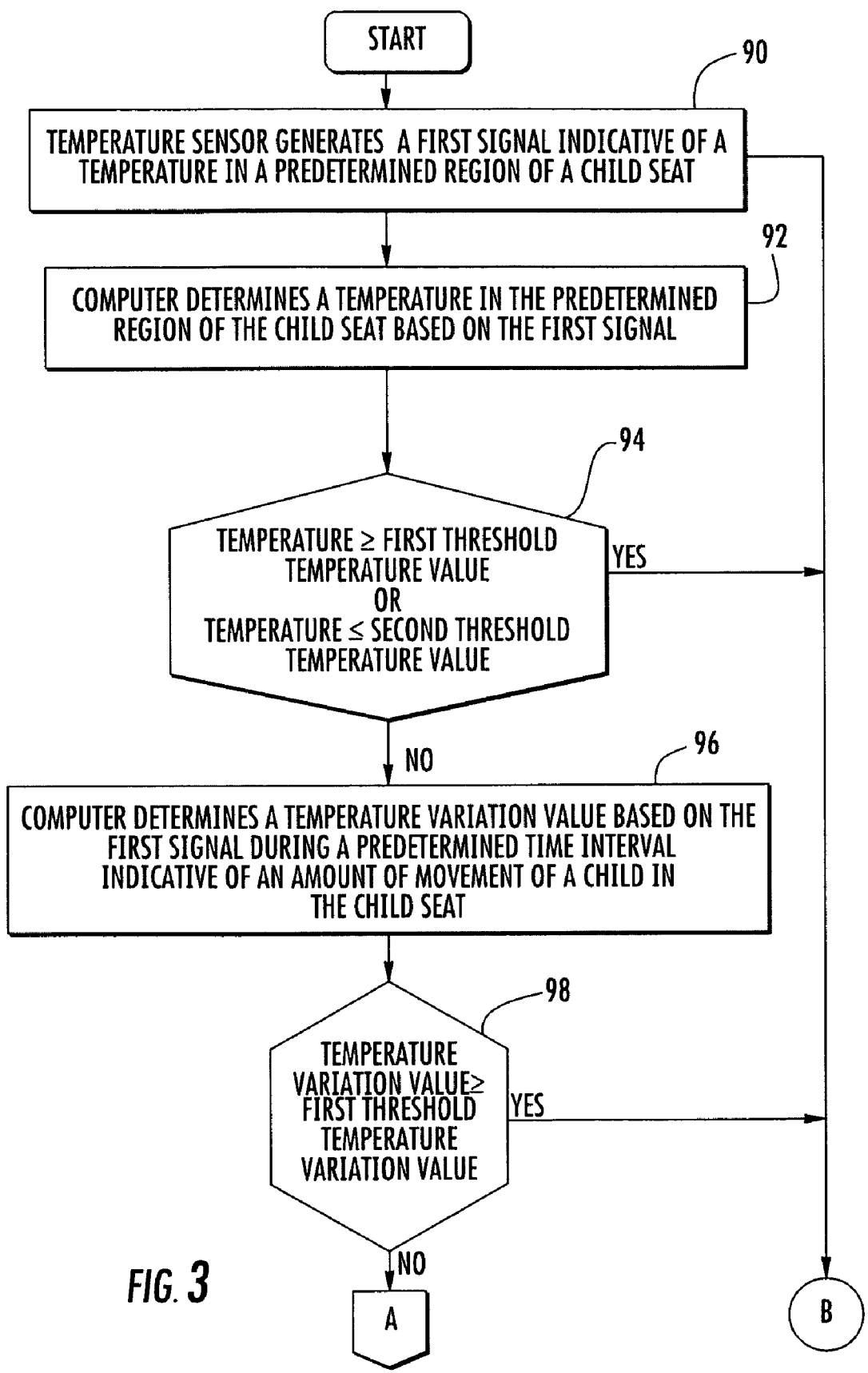
FIGS. 3-5 are flowcharts of a method for monitoring a child seat of FIG. 1.
Figure 4:
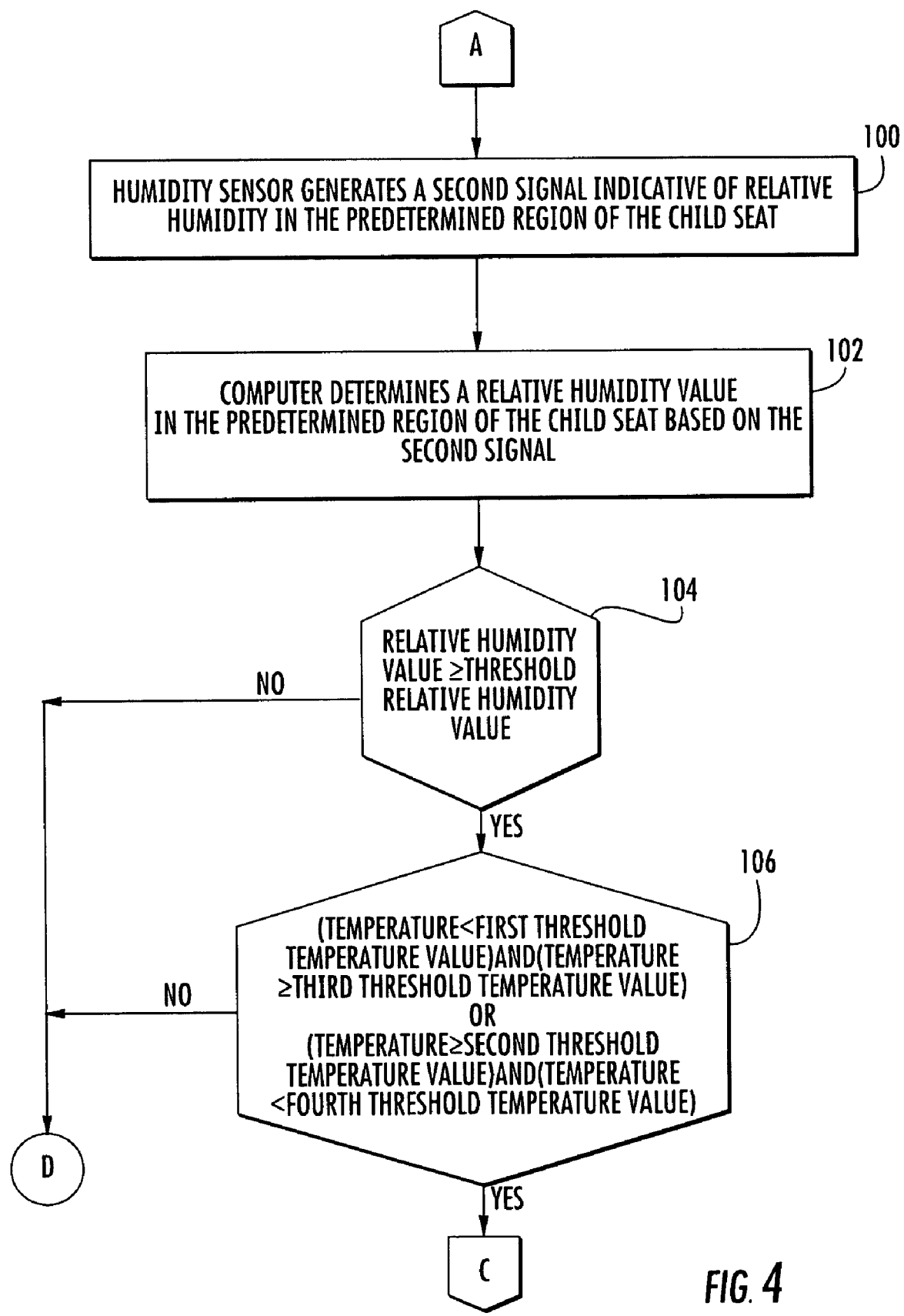
Figure 5:
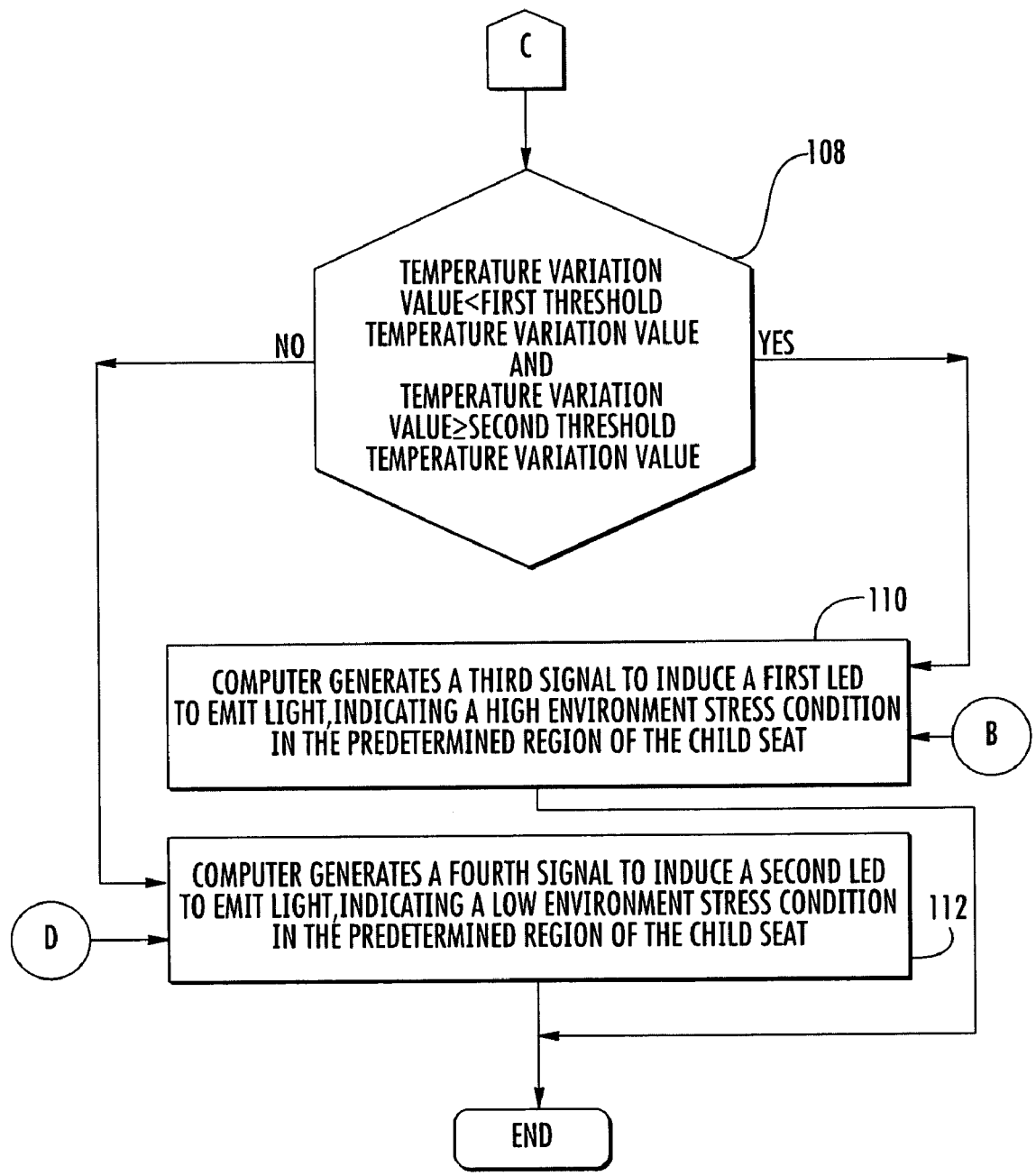

Referring to FIGS. 3-5, a method for monitoring the child seat 20 is illustrated. The method can be implemented utilizing software algorithms executed by the computer 60 of the child seat monitoring system 24.

At step 90, the temperature sensor 62 generates a first signal indicative of a temperature in a predetermined region of the child seat 20.

At step 92, the computer 60 determines a temperature in the predetermined region of the child seat 20 based on the first signal.

At step 94, the computer 60 makes a determination as to whether the temperature is greater than or equal to a first threshold temperature value or the temperature is less than or equal to a second threshold temperature value. If the value of step 94 equals "yes" the method advances to step 110. Otherwise, the method advances to step 96.

At step 96, the computer 60 determines a temperature variation value based on the first signal during a predetermined time interval indicative of an amount of movement of a child in the child seat 20.

At step 98, the computer 60 makes a determination as to whether the temperature variation value is greater than or equal to a first threshold temperature variation value. If the value at step 98 equals "yes" the method advances to step 110. Otherwise, the method advances to step 100.

At step 100, the humidity sensor 63 generates a second signal indicative of relative humidity in the predetermined region of the child seat 20.

At step 102, the computer 60 determines a relative humidity value in the predetermined region of the child seat based on the second signal.

At step 104, the computer 60 makes a determination as to whether the relative humidity value is greater than or equal to a threshold relative humidity value. If the value of step 104 equals "yes" the method advances to step 106. Otherwise, the method advances to step 112.

At step 106, the computer 60 makes a first determination as to whether (i) the temperature is less than a first threshold temperature value, and the temperature is greater than or equal to a third threshold temperature value, and (ii) whether the temperature is greater than or equal to a second threshold temperature value, and the temperature is less than a fourth threshold temperature value. If the value of step 106 equals "yes" the method advances to step 108. Otherwise, the method advances to step 112.

At step 108, the computer 60 makes a determination as to whether (i) the temperature variation value is less than a first threshold temperature variation value and (ii) the temperature variation value is greater than or equal to a second threshold temperature variation value. If the value of step 108 equals "yes" the method advances to step 110. Otherwise, the method advances to step 112.

At step 110, the computer 60 generates a third signal to induce a LED 64 to emit light, indicating a high environment stress condition in the predetermined region of the child seat 20. In an alternate method, the computer 60 generates a signal to induce the speaker to emit a first sound indicating a high environment stress condition in the predetermined region of the child seat 20. In another alternate method, the computer 60 generates a signal to induce the LCD 70 to display a first message indicating a high environment stress condition in the predetermined region of the child seat 20.

At step 112, the computer 60 generates a fourth signal to induce a LED 66 to emit light, indicating a low environment stress condition in the predetermined region of the child seat 20. Of course, in an alternate method, the computer 60 generates a signal to induce the speaker to emit a second sound indicating a high environment stress condition in the predetermined region of the child seat 20. In another alternate method, the computer 60 generates a signal to induce the LCD 70 to display a second message indicating a high environment stress condition in the predetermined region of the child seat 20.

Figure 6:
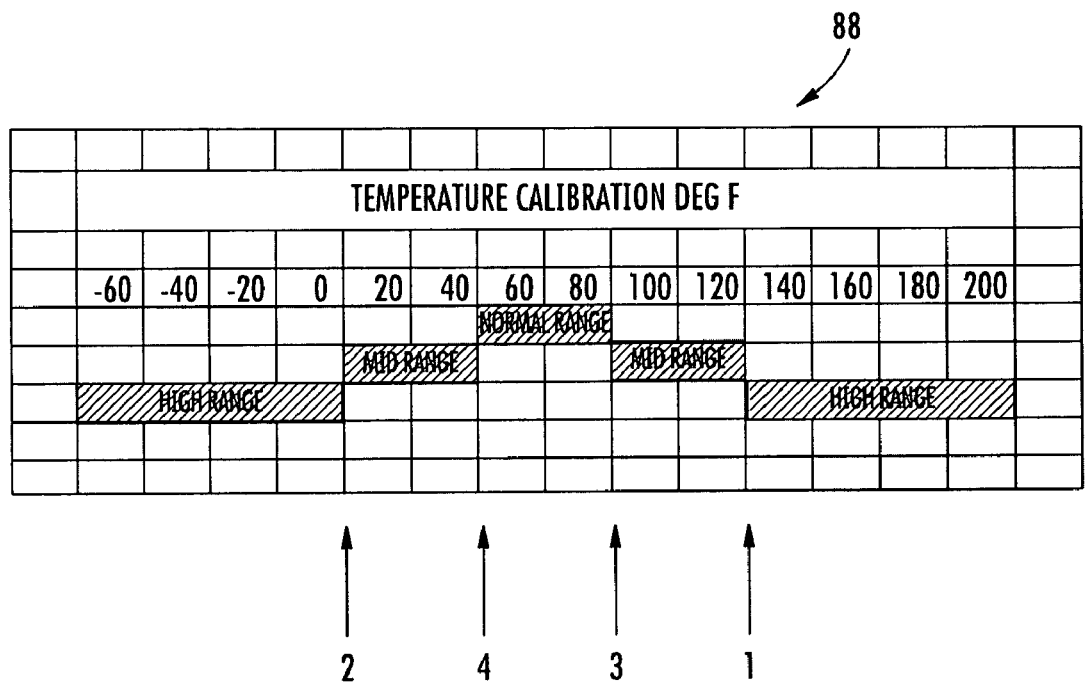
FIG. 6 is a temperature calibration table utilized by the child monitoring system of FIG. 2.

Referring to FIG. 6, a plot 88 of an exemplary temperature calibration range of the child restraint system 10 of FIG. 1 is illustrated. Specifically, in one embodiment, the first threshold temperature is 120° F., the second threshold temperature is 0° F., the third threshold temperature is 80° F., and the fourth threshold temperature is 40° F. The first, second, third, and fourth threshold temperature values are exemplary temperature values, and other threshold temperature values could be used by those skilled in the art.

The child restraint system and a method for monitoring the temperature in a predetermined region of the child seat provide a substantial advantage over other systems and methods. In particular, the child restraint system utilizes a computer to monitor the temperature of the child seat and to provide an indication to a user as to whether the temperature in the predetermined region of the child seat is excessive.

As described above, the method for monitoring the temperature in a predetermined region of the child seat can be embodied in the form of computer-implemented processes and apparatuses for practicing those processes. In an exemplary embodiment, the method is embodied in computer program code executed by one or more elements. The present method may be embodied in the form of computer program code containing instructions embodied in tangible media, such as floppy diskettes, CD-ROMs, hard drives, flash memory, or any other computer-readable storage medium, wherein, when the computer program code is loaded into and executed by a computer, the computer becomes an apparatus for practicing the invention. The present method can also be embodied in the form of computer program code, for example, whether stored in a storage medium, loaded into and/or executed by a computer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for monitoring a child seat, comprising:
   generating a first signal indicative of a temperature in a predetermined region of the child seat via a temperature sensor disposed on the child seat;
   determining when the temperature is greater than or equal to a first threshold temperature value or less than or equal to a second threshold temperature value, the second threshold temperature value being less than the first threshold temperature value; and
   generating a second signal when either the temperature is greater than or equal to the first threshold temperature value or less than or equal to the second threshold temperature value.

2. The method of claim 1, further comprising determining a temperature variation value based on the first signal.

3. The method of claim 2, further comprising determining when the temperature variation value is greater than or equal to a threshold temperature variation value, and generating a third signal when the temperature variation value is greater than or equal to the threshold temperature variation value.

4. The method of claim 2, further comprising generating a third signal indicative of a relative humidity in the predetermined region of the child seat utilizing a humidity sensor, and determining a relative humidity value based on the third signal.

5. The method of claim 4, further comprising generating a fourth signal when the relative humidity value is greater than or equal to a threshold relative humidity value, and the temperature is both less than the first threshold temperature value and greater than or equal to a third threshold temperature value, the third threshold temperature value being less than the first threshold temperature value, and the temperature variation value is both less than a first threshold temperature variation value and greater than or equal to a second threshold temperature variation value, the second threshold temperature variation value being less than the first threshold temperature variation value.

6. The method of claim 4, further comprising generating a fourth signal when the relative humidity value is greater than or equal to a threshold relative humidity value, and the temperature is both greater than or equal to the second threshold temperature value and less than a third threshold temperature value, the third threshold temperature value being greater than the second threshold temperature value, and the temperature variation value is both less than a first threshold temperature variation value and greater than or equal to a second threshold temperature variation value, the second threshold temperature variation value being less than the first threshold temperature variation value.

7. The method of claim 1, further comprising emitting light from a first light emitting diode in response to the second signal.

8. The method of claim 1, further comprising emitting sound from an electrical speaker in response to the second signal.

9. A child seat monitoring system for a child seat, comprising:
   a temperature sensor disposed on the child seat for generating a first signal indicative of a temperature in a predetermined region of the child seat; and
   a computer operably communicating with the temperature sensor, the computer configured to determine when either the temperature is greater than or equal to a first threshold temperature value or less than or equal to a second threshold temperature value, the second threshold temperature value being less than the first threshold temperature value, the computer further configured to generate a second signal when either the temperature is greater than or equal to the first threshold temperature value or less than or equal to the second threshold temperature value.

10. The child seat monitoring system of claim 9, wherein the child seat has a carrier portion and a handle coupled to the carrier portion, the temperature sensor being disposed on the handle such that the temperature sensor has a field of view of at least the predetermined region of the child seat, the predetermined region being at least a portion of the carrier portion.

11. The method of claim 10, further comprising displaying a message utilizing a liquid crystal display in response to the second signal.

12. The child seat monitoring system of claim 9, wherein the computer is further configured to determine a temperature variation value based on the first signal.

13. The child seat monitoring system of claim 12, wherein the computer is further configured to determine when the temperature variation value is greater than or equal to a threshold temperature variation value, the computer further configured to generate a third signal when the temperature variation value is greater than or equal to the threshold temperature variation value.

14. The child seat monitoring system of claim 12, further comprising a humidity sensor disposed on the child seat for generating a third signal indicative of a relative humidity in the predetermined region of the child seat, the computer being further configured to determine a relative humidity value based on the third signal.

15. The child seat monitoring system of claim 14, wherein the computer is further configured to generate a fourth signal when the relative humidity value is greater than or equal to a threshold relative humidity value, and the temperature is both less than the first threshold temperature value and greater than or equal to a third threshold temperature value, the third threshold temperature value being less than the first threshold temperature value, and the temperature variation value is both less than a first threshold temperature variation value and greater than or equal to a second threshold temperature variation value, the second threshold temperature variation value being less than the first threshold temperature variation value.

16. The child seat monitoring system of claim 14, wherein the computer is further configured to generate a fourth signal when the relative humidity value is greater than or equal to a threshold relative humidity value, and the temperature is both greater than or equal to the second threshold temperature value and less than a third threshold temperature value, the third threshold temperature value being greater than the second threshold temperature value, and the temperature variation value is both less than a first threshold temperature variation value and greater than or equal to a second threshold temperature variation value, the second threshold temperature variation value being less than the first threshold temperature variation value.

17. The child seat monitoring system of claim 9, further comprising a first light emitting diode configured to emit light in response to the second signal.

18. The child seat monitoring system of claim 9, further comprising an electrical speaker configured to emit a sound in response to the second signal.

19. The child seat monitoring system of claim 9, further comprising a liquid crystal display configured to display a message in response to the second signal.

20. A child restraint system adapted to be mounted within a vehicle, the child restraint system comprising:
   a child seat having a carrier portion and a handle coupled to the carrier portion; and
   a temperature sensor disposed on the handle for generating a first signal indicative of a temperature in a predetermined region of the child seat.

21. The child restraint system of claim 20, further comprising a computer operably communicating with the temperature sensor, the computer configured to determine when either the temperature is greater than or equal to a first threshold temperature value or less than or equal to a second threshold temperature value, the second threshold temperature value being less than the first threshold temperature value, the computer further configured to generate a second signal when either the temperature is greater than or equal to the first threshold temperature value or less than or equal to the second threshold temperature value.

22. The child restraint system of claim 20, wherein the temperature sensor has a field of view of at least the predetermined region of the child seat, the predetermined region being at least a portion of the carrier portion.

* * * * *